US012554850B2

(12) United States Patent
Zaidi et al.

(10) Patent No.: US 12,554,850 B2
(45) Date of Patent: Feb. 17, 2026

(54) SYSTEMS AND METHODS FOR ADAPTIVELY DETECTING AND MITIGATING ROWHAMMER ATTACKS AGAINST COMPUTER MEMORIES

(71) Applicant: NXP USA, INC., Austin, TX (US)

(72) Inventors: Asim Abbas Zaidi, San Jose, CA (US); James Andrew Welker, San Jose, CA (US); Mazyar Razzaz, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 289 days.

(21) Appl. No.: 18/169,671

(22) Filed: Feb. 15, 2023

(65) Prior Publication Data

US 2024/0273202 A1 Aug. 15, 2024

(51) Int. Cl.
  *G06F 21/56* (2013.01)
  *G06F 12/14* (2006.01)
  *G06F 21/55* (2013.01)

(52) U.S. Cl.
  CPC ........ *G06F 21/566* (2013.01); *G06F 12/1433* (2013.01); *G06F 21/554* (2013.01); *G06F 2212/1052* (2013.01); *G06F 2212/70* (2013.01); *G06F 2221/034* (2013.01)

(58) Field of Classification Search
  CPC .. G06F 21/566; G06F 12/1433; G06F 21/554; G06F 2212/1052; G06F 2212/70; G06F 2221/034
  See application file for complete search history.

(56) References Cited

U.S. PATENT DOCUMENTS

| | | | |
|---|---|---|---|
| 9,812,185 B2 | 11/2017 | Fisch et al. | |
| 10,373,667 B2 * | 8/2019 | Benedict | G11C 7/02 |
| 10,950,288 B2 | 3/2021 | Nale et al. | |
| 11,354,408 B2 | 6/2022 | Ghosh et al. | |
| 2022/0121398 A1 * | 4/2022 | Nale | G06F 3/0659 |

(Continued)

OTHER PUBLICATIONS

S. M. Seyedzadeh, A. K. Jones and R. Melhem, "Counter-Based Tree Structure for Row Hammering Mitigation in DRAM," Jan. 1-Jun. 2017, in IEEE Computer Architecture Letters, vol. 16, No. 1, pp. 18-21 (Year: 2017).*

(Continued)

*Primary Examiner* — Kaushikkumar M Patel
*Assistant Examiner* — Christian Joseph O'Connell

(57) ABSTRACT

Systems and methods for adaptively detecting and mitigating RowHammer attacks or events against computer memories have been described. In an illustrative, non-limiting embodiment, a system may include a memory controller, and a RowHammer detection circuit coupled to the memory controller, where the RowHammer detection circuit is configured to: receive a count of activate commands for a segment of a memory device, where the segment comprises one or more of a plurality of memory cell rows; and detect a RowHammer event based, at least in part, upon a determination that the count of activate commands meets at least one of a plurality of trigger levels. Either the RowHammer detection circuit, or a different circuit, can then apply at least one of a plurality of RowHammer mitigation techniques, wherein each of the plurality of RowHammer mitigation techniques corresponds to at least one of the plurality of trigger levels.

15 Claims, 9 Drawing Sheets

(56) References Cited

U.S. PATENT DOCUMENTS

2022/0199144 A1    6/2022   Roberts
2023/0044186 A1*   2/2023   You .................... G11C 11/4093

OTHER PUBLICATIONS

Abdullah Giray Yaglikci et al: "BlockHammer: Preventing RowHammer at Low Cost by Blacklisting Rapidly-Accessed DRAM Rows", Jul. 29, 2022, arxiv.org, Cornell University Library, 201 Olin Library Cornell University Ithaca, NY, pp. 1-15.

"LPDDR5 Rfm Clarification R0," CXMT, May 5, 2022, 4 pages, JC42.6_9 LPDDR TG, publisher JEDEC.

Ingab Kang, et al., "CAT-TWO: Counter-Based Adaptive Tree, Time Window Optimized for DRAM Row-Hammer Prevention," 2020, pp. 17366-17377, vol. 8, publisher IEEE Access.

Eojin Lee, et al., "TWiCe: Time Window Counter Based Row Refresh to Prevent Row-Hammering," IEEE Computer Architecture Letters, Jan.-Jun. 2018, pp. 96-99, vol. 17, No. 1, publisher IEEE.

Seyed Mohammad Seyedzadeh, et al., "Counter-Based Tree Structure for Row Hammering Mitigation in DRAM," IEEE Computer Architecture Letters, Jan.-Jun. 2017, pp. 18-21, vol. 16, No. 1, publisher IEEE.

Kim, et al., "Revisiting rowhammer: An experimental analysis of modern dram devices and mitigation techniques," 2020 ACM/IEEE 47th Annual International Symposium on Computer Architecture (ISCA), 2020, pp. 1-14, publisher EEE.

* cited by examiner

SYSTEMS AND METHODS FOR ADAPTIVELY DETECTING AND MITIGATING ROWHAMMER ATTACKS AGAINST COMPUTER MEMORIES

FIELD

This disclosure relates generally to computer memories, and more particularly, to systems and methods for adaptively detecting and mitigating RowHammer attacks and events against computer memories.

BACKGROUND

Dynamic random-access memory (DRAM) is a type of semiconductor memory that stores each bit of data in a memory cell. In most DRAM designs, a capacitor within each memory cell can either be charged or discharged, and these two states are taken to represent the two possible values of a bit, often referred to as "0" and "1." DRAM devices typically take the form of an Integrated Circuit (IC) or chip, which can include dozens to billions of DRAM memory cells.

As the inventors hereof have recognized, accessing a given row of DRAM can result in small changes to voltages stored in the memory cells of two adjacent rows, above and below the given row. When the DRAM is periodically refreshed, the proper voltage levels of all of the memory cells are restored.

If a particular row of DRAM is accessed many times between DRAM refresh cycles, however, then the effects of those accesses on the memory cell voltages can accumulate. As voltage changes accumulate, the logical values they represent can flip from 1 to 0, or from 0 to 1. This is generally referred to as a "RowHammer event."

Moreover, when operations are performed with the intent to flip bits stored in a DRAM's memory cells, a resulting RowHammer event may be said to constitute a so-called "RowHammer attack." In a RowHammer attack, a row (having row address R) intended to be accessed is referred to as a "target row," and its two adjacent rows (R+1) and (R−1) are referred to as "victim rows.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

Systems and methods described herein are usable to detect and mitigate RowHammering attacks and events against DRAM devices. Although the description describes detection and mitigation for RowHammer attacks, the same detection and mitigation is used for non-intentional Row-Hammer events. RowHammer events therefore include intentional attacks as well as any kind of non-intentional activity during a normal flow of transactions.

In some embodiments, these systems and methods may be configured to detect RowHammering attacks or events. These embodiments may profile an application's or user's use of DRAM and may optimize its monitoring. In some cases, these embodiments may provide, among other things, target application-specific modeling and adaptive-sized address range monitoring.

In other embodiments, these systems and methods may be configured to mitigate RowHammering exploitations. Specifically, these embodiments may mitigate RowHammering attacks or events through a multi-layered prevention approach where: (a) application-definable triggers are usable to slow an attack or event down, (b) trigger levels are usable to narrow the time window of attack or event, and (c) a final trigger is usable to stop the attack or event. For example, an implementation may include a first yellow-line trigger for slowing the attack or event, a second orange-line trigger for narrowing the time window of attack or event, and a third red-line trigger for stopping the attack or event.

Figure 1:
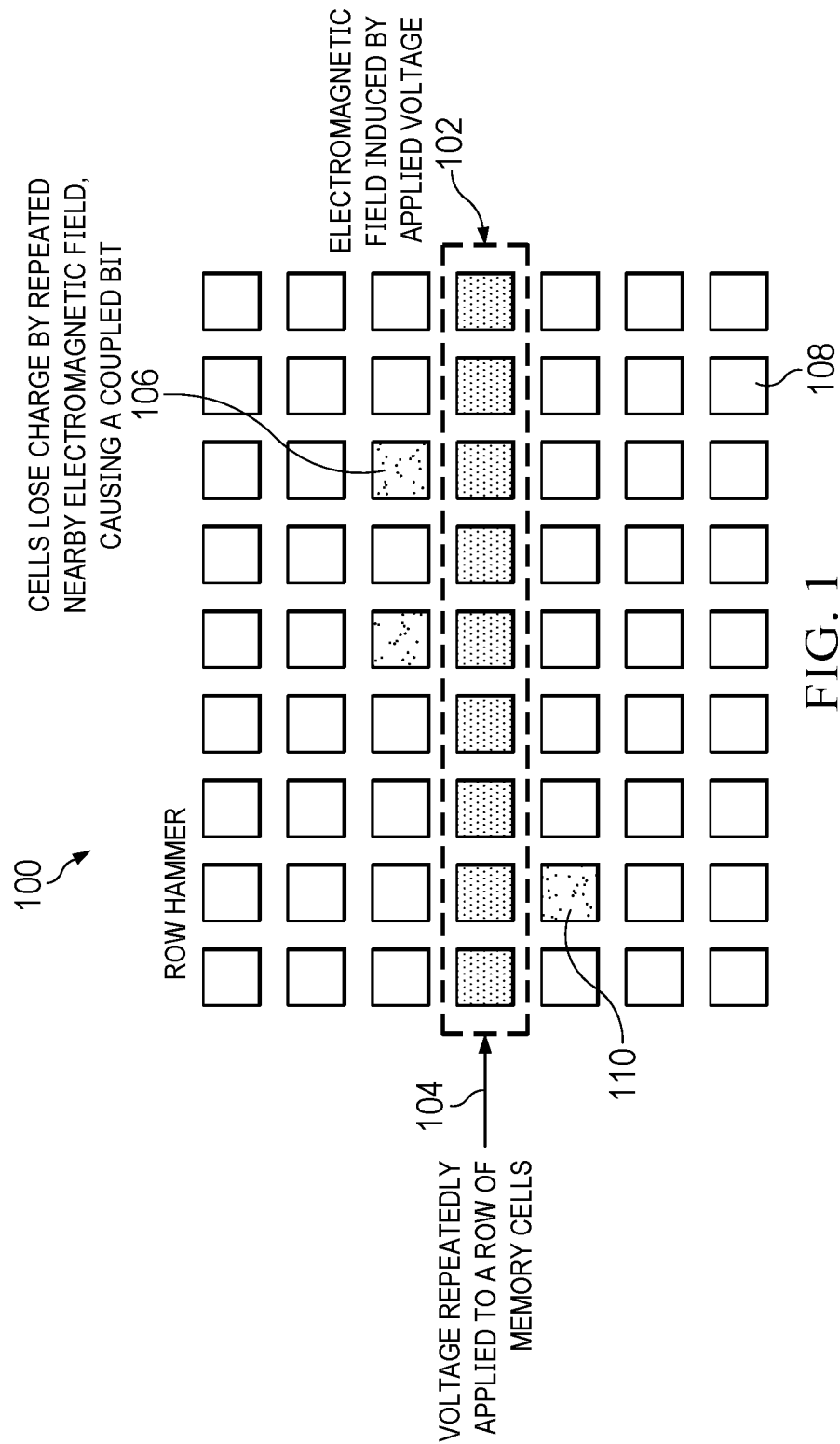
FIG. 1 is a block diagram depicting a RowHammer attack or event, according to some embodiments.

FIG. 1 depicts a block diagram depicting a RowHammer attack or event, according to some embodiments. DRAM circuit 100 includes bits of information represented as blocks, such as block 108. These bits are arranged into rows, such as row 102. In a RowHammer attack or event, a voltage is repeatedly applied to row 102 of a memory cell, as shown in 104. The applied voltage induces an electromagnetic field around row 102. Cells (106 and 110) lose charge by repeated nearby electromagnetic field, causing a coupled bit.

This vulnerability has garnered significant interest in both computer architecture and computer security research communities because it stems from physical circuit-level interference effects. RowHammering empowers an attacker who has access to DRAM address X with the ability to modify data in a different location Y such that X and Y are physically, but not necessarily logically, co-located. In particular, X and Y must be located in different DRAM rows that are in close proximity to one another. Because DRAM is widely used throughout modern computing systems, many systems are potentially vulnerable to RowHammer attacks or events.

RowHammering is a serious challenge for system designers because it exploits fundamental DRAM circuit behavior that cannot be easily changed. This means that RowHammering is a potential threat across all DRAM generations and designs.

Moreover, RowHammering appears to be an effect of continued DRAM technology scaling, which means that as manufacturers increase DRAM storage density, their chips are potentially more susceptible to attacks. This increase in RowHammering vulnerability is often quantified for a given DRAM chip by measuring the number of times a single row must be activated (i.e., single-sided RowHammer) to induce the first bit flip.

As the inventors hereof have determined, a circuit-level charge leakage mechanism is often responsible for enabling RowHammering effects. This leakage mechanism affects nearby circuit components, which implies that as manufacturers continue to employ aggressive technology scaling for generational storage density improvements, circuit components that are more tightly packed will likely increase a chip's vulnerability to RowHammering.

DRAM Organization

A typical computing system includes multiple DRAM channels, where each channel has a separate I/O bus and operates independently of the other channels in the system. A memory controller can interface with multiple DRAM ranks by time-multiplexing the channel's I/O bus between the ranks. Because the I/O bus is shared, the memory controller serializes accesses to different ranks in the same channel. A DRAM rank includes multiple DRAM chips that operate in lockstep. The combined data pins from all chips form the DRAM data bus.

A modern DRAM chip contains billions of cells, each of which stores a single bit of data. Within a chip, cells are organized hierarchically to provide high density and performance. A DRAM chip is composed of multiple (e.g., 8-16) DRAM banks. All banks within a chip share the internal data and command bus. A bank includes many (e.g., 128) subarrays. Each subarray contains a two-dimensional array of DRAM cells arranged in rows and columns.

Figure 2:
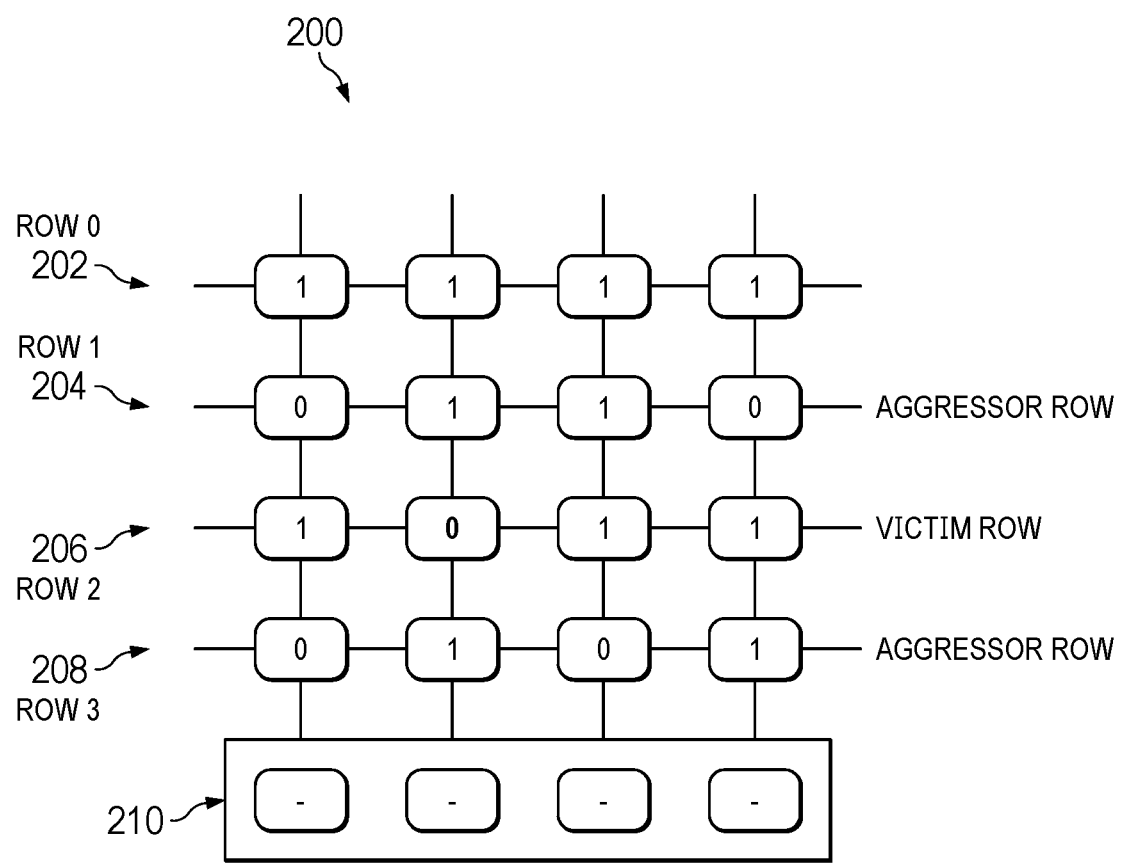
FIG. 2 is a diagram depicting results of a RowHammer attack or event in a two-dimensional array of DRAM cells arranged into rows and columns, according to some embodiments.

FIG. 2 is a diagram depicting results of a RowHammer attack or event in a two-dimensional array (200) of DRAM cells arranged into rows and columns. A DRAM cell includes an access transistor and a capacitor. The wordline is connected to the gate of the access transistor that, when enabled, connects the cell capacitor to the bitline. A DRAM cell stores a single bit of data based on the charge level of the cell capacitor (e.g., a charged capacitor represents a logical value of "1" and a discharged capacitor a value of "0", or vice versa).

When accessing the DRAM, the memory controller first provides the address of the row to be accessed. Then, the row decoder, which is also hierarchically organized into global and local components, opens the row, such as row 1 (204) or row 3 (208), by driving the corresponding wordline. DRAM cells that are connected to the same wordline are collectively referred to as a DRAM row. In FIG. 2 the rows are Row 0 (202), Row 1 (204), Row 2 (206), and Row 3 (208). To read and manipulate a cell's contents, a wire (i.e., bitline) connects a column of cells to a sense amplifier. The collection of sense amplifiers in a subarray is referred to as the local row buffer (210). The local row buffer (210) of the subarray (200) in a bank are connected to a per-bank global row buffer, which interfaces with the internal command and data bus of the DRAM chip.

A memory controller issues a sequence of DRAM commands to access data in a DRAM chip. Basically, there are two steps required to read/write from a DRAM bank. First, the memory controller issues an activate (ACT) command to open a row, such as row 1 (204) or row 3 (208), that corresponds to the memory address to be accessed. Opening (i.e., activating) a DRAM row causes the data in the target DRAM row to be copied to its corresponding local row buffer (210). Second, the READ or WRITE commands with associated column and bank address is performed to transfer the content of the row buffer to the memory controller (READ/WRITE from an open page). The memory controller issues either a READ or a WRITE command to the DRAM to read out or update the target data within the row buffer, typically 32 or 64 bytes split across all chips in the rank. The memory controller can issue multiple consecutive READ and WRITE commands to an open row. While a row is open, such as row 1 (204), its cells remain connected to the sense amplifiers in the local row buffer (210), so changes to the data stored in the row buffer (210) propagate to the DRAM cells in row 1 (204). When accesses to the open row 1 (204) are complete, the memory controller issues a precharge (PRE) command to close the open row 1 (204) and prepare the bank to activate a different row.

If a given READ/WRITE to be performed on a bank that already has a different row activated in a row buffer, then the memory controller performs a similar but slightly different operation. First a pre-charge command is issued to transfer the existing row buffer (210) back to its row in the bank (to close the existing page). For example, if row 1 (204) is activated, a pre-charge command is issued to transfer the existing row buffer (210) back to its row 1 (204). Second, an activate command with a new row, such as row 3 (208), of the same bank will transfer the content of the new row 3 (208) to the row buffer 210 (opening a new page). Next a READ/WRITE command with the corresponding column of the same bank will transfer the data from row buffer 210 to the memory controller READ/WRITE from the newly opened page.

Unfortunately, charge leaks from the storage capacitor over time due to various charge leakage paths in the circuit components. To ensure that the cell does not leak enough charge to cause a bit-flip, a DRAM cell needs to be periodically refreshed. DRAM cell capacitors lose their charge over time, potentially resulting in bit-flips. A cell's retention time refers to the duration for which its capacitor maintains the correct value. Cells throughout a DRAM chip have different retention times, ranging from milliseconds to hours. To prevent data loss, the memory controller issues regular refresh (REF) commands that ensure every DRAM cell is refreshed. A refresh window can be, in some embodiments, the time between two consecutive refresh commands to a single DRAM row. The refresh window can vary for different DRAM chips. A maximum activate count (MAC) can be a DRAM vendor specific maximum number of activate commands that are allowed in the refresh window.

If there are too many activate commands to a given row of a given bank, RowHammering can occur when the content of a victim row 206 adjacent to an aggressor row (204, 208) being constantly activated can be changed (unwanted flip of a bit in victim row). Modern DRAM devices suffer from these disturbance errors that occur when a high rate of accesses to a single DRAM row (204) unintentionally flip the values of cells in nearby rows (202). In many instances, the worst-case circuit-level RowHammer conditions for a victim row (206) are when both physically-adjacent aggressor rows (204, 208) are repeatedly accessed as rapidly as possible (i.e., double-sided RowHammer).

RowHammering inherently stems from electromagnetic interference between nearby cells, which is exacerbated by reduction in process technology node size because adjacent DRAM cells become both smaller and closer to each other. Therefore, as DRAM manufacturers continue to increase DRAM storage density, a chip's vulnerability to bit flips increase.

Moreover, RowHammering exposes a system-level security vulnerability. RowHammering can be used to mount system-level attacks for privilege escalation, leaking confidential data, and denial of service. Some RowHammer attacks have demonstrated being able to extract secure data/keys from a system-on-a-chip (SOC). A system must provide protection against RowHammering to ensure robust (i.e., reliable and secure) execution.

RowHammering can be mitigated by counting the number of activates to a DRAM row, and then refreshing the corresponding victim rows before the count surpasses a RowHammer threshold. However, these approaches can either incur a significant area overhead or additional activations that could degrade the system performance. To fully cover all possible victim rows, as an example, approximately 65,000 counters would be needed to monitor a RowHammering exploitation, and that would be prohibitive implementation in silicon.

Instead, knowing (or predicting) the locations of bit flips before they occur in practice may lead to a large reduction in RowHammering mitigation overhead. Some embodiments of the presented systems and methods to adaptively detect and mitigate DRAM RowHammer attack or events provide new and novel methodologies to detect and mitigate RowHammering exploitations, while reducing the area and performance overhead in silicon implementation compared to mechanisms that are not scalable or suffer from prohibitively large performance overheads.

Embodiments for Adaptively Detecting and Mitigating RowHammer Attacks or Events

This disclosure provides at least two sets of embodiments to adaptively detect and mitigate RowHammer attacks or events. A first set of embodiments detects RowHammering exploitations, and a second set of embodiments mitigate the RowHammering exploitations.

Depending on the embodiment, adaptively detecting and mitigating RowHammer attacks or events might be implemented in hardware or software. Embodiments implemented in hardware can take advantage of DRAM Controller acceleration. These embodiments can ensure more security to prevent malicious code from tampering with a pure software implementation. Implementing in hardware would still allow some configurability via programmable triggers in user software.

Figure 3:
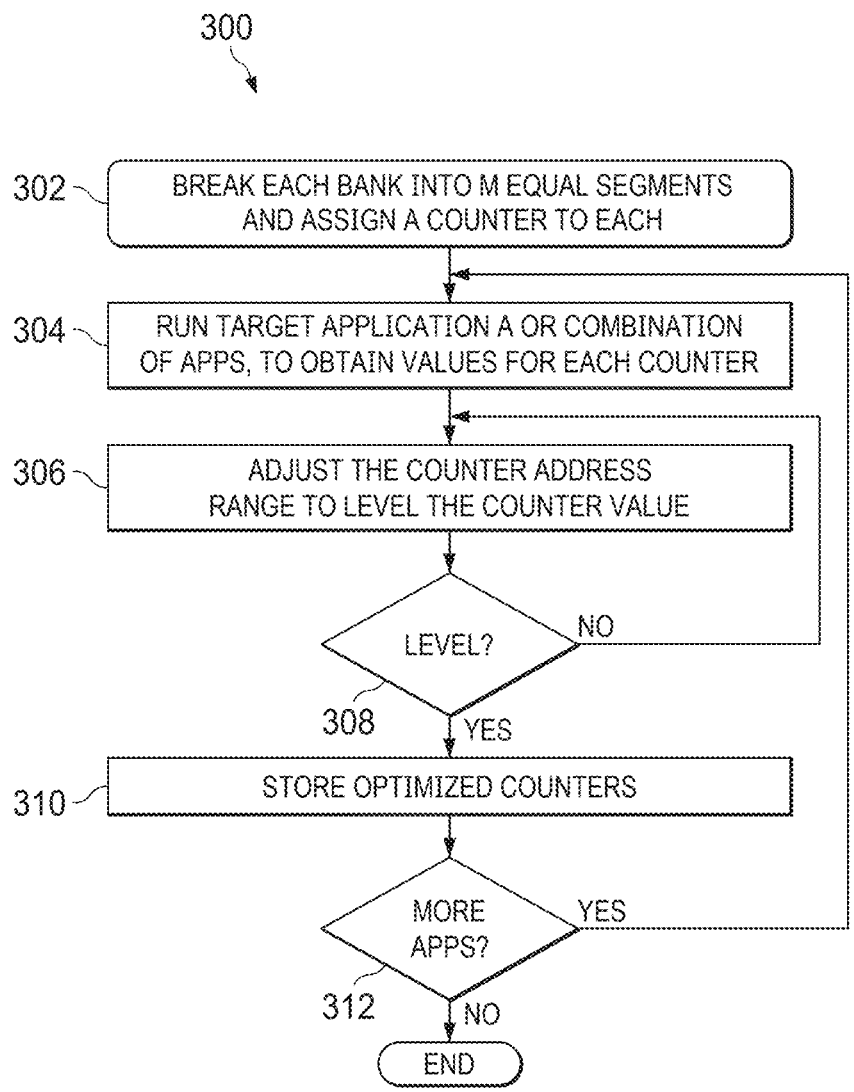
FIG. 3 is a flowchart of a method for detecting RowHammering exploitations, according to some embodiments.

FIG. 3 is a flowchart (300) of a method for detecting RowHammering exploitations, according to some embodiments. The example of FIG. 3 starts with an m number of counters assigned to each DRAM bank. In block 302, each bank is broken into m equal segments, and one of the m counters is assigned to each of the m equal segments. Each counter has an address range assigned to it, which corresponds to the rows of the DRAM bank it is associated with. As will be explained below, this address range associated with each counter can be modified as the flowchart of FIG. 3 progresses. Initially, however, the address range for each counter is equal in size, meaning that each counter is assigned to an equal-sized address space. Therefore, initially, each counter will count the activate commands in its equal-sized range of addresses within the assigned DRAM bank.

Figure 4:
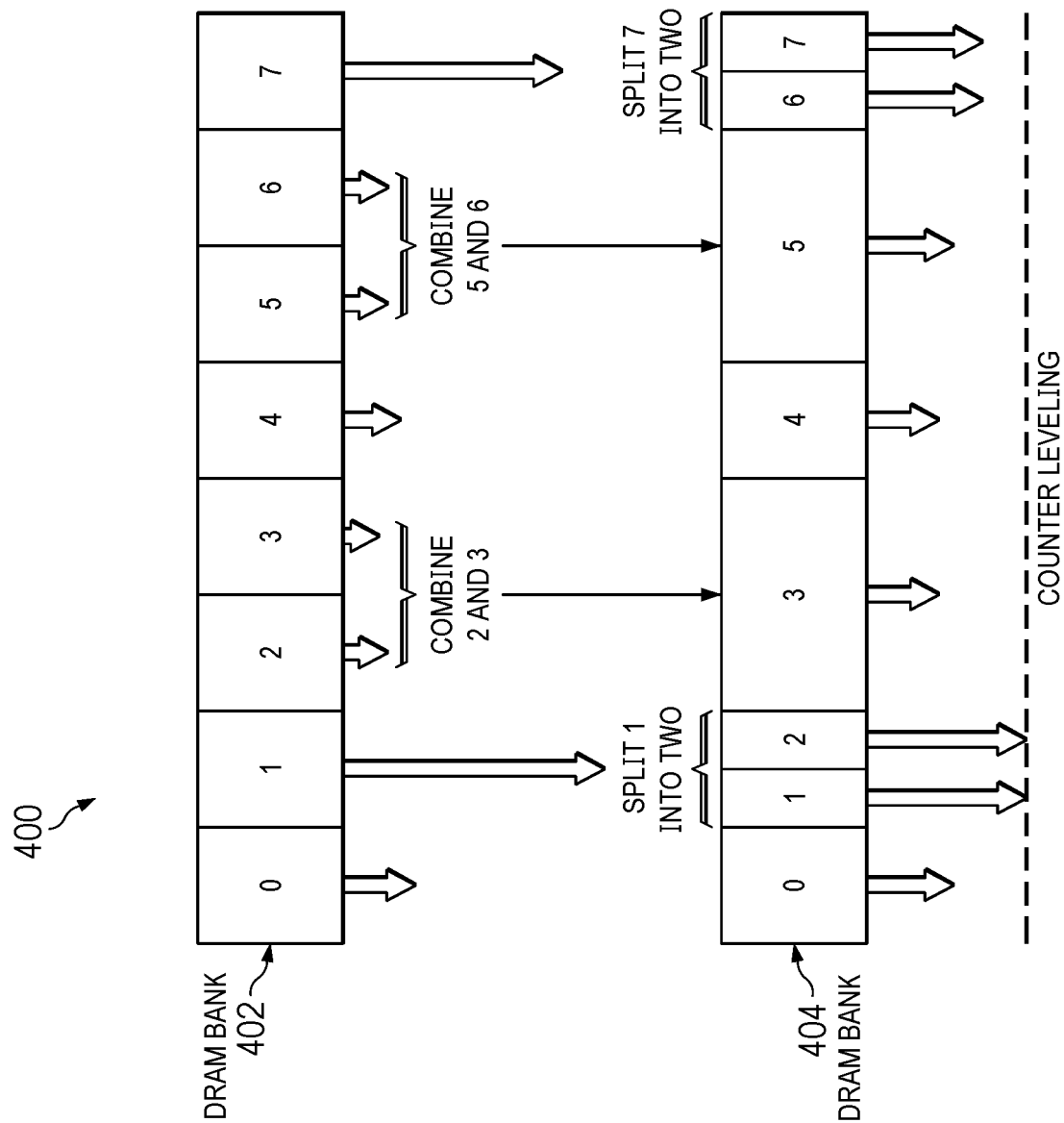
FIG. 4 depicts a process for leveling the count values of the counters that are assigned to a range of addresses within an assigned DRAM bank, according to some embodiments.

A target application A, or a combination of applications, is then run, in block 304. As target application A is run, each counter counts the activate commands in its equal-sized range of addresses within the assigned DRAM bank. Then, still at block 304, the values of each of the m counters is obtained. In block 306, the assigned address range associated with some or all of the counters is adjusted to level the count values of the counters. This process of leveling the count values of the counters will explained more fully when FIG. 4 is discussed.

After the equal-sized range of addresses associated with each of the counters are adjusted to level the count values, then the range of addresses associated with each of the counters are no longer equal in size. Some counters will necessarily be associated with larger address ranges, and some counters will be associated with smaller address ranges. In some embodiments, the counter address range is adjusted independently (i.e., the address range may stay in the assigned bank or go beyond). This would be to maximize the detection time, by adapting/adjusting the address range to level the counter values.

After block 306, block 308 determines whether, after adjusting the address range associated with some or all of the counters in order to level the count values, the count values of the counters would be appropriately level. If the count values of the counters are not appropriately level in block 308, then the flowchart returns to block 306 to readjust the assigned address range associated with some or all of the counters, in some embodiments.

In other embodiments, if the count values of the counters are not appropriately level in block 308, then the flowchart might return to block 304 to run the target application A again, in order to recount the activate commands for each of the counters with their newly assigned (non-equal sized) range of DRAM addresses. Block 306 (or blocks 304 and 306 in some embodiments) is therefore repeated until the values of all the m counters reach a desired leveling range. In some embodiments, the same process can be repeated by adding or removing counters for each bank as well as adjusting their address ranges.

Then, in block 310 the final address range associated with each of the m counters of each bank, as well as the count values for each of the m counters of each bank, are stored as the expected activity or target application model.

In block 312, if there are more applications (B, C, D, . . . , etc.), then each one is run separately to obtain the value of counters for each application. Therefore, if block 312 determines that there are more applications to run, then the flowchart returns to block 304 to run the next target application, in order to count the activate commands for each of the counters, in some embodiments. In other embodiments, the flowchart might return to block 302 and break each bank into equal-sized memory segments again before continuing. If block 312 determines that there are no more applications to run, then the flowchart ends.

In some embodiments, the counter values are captured during the validation phase of customer products. For example, for customer products involving a security camera, the security camera would be used during validation and a max/superset of counter values would be selected as the base line.

By predetermining the access counts by earlier execution of the application(s), a RowHammer attack or event may be detected. This is because the attack or event would increase the number of activates and go beyond the baseline counter values.

FIG. 4 depicts a process (400) for leveling the count values of the counters that are assigned to a range of addresses within an assigned DRAM bank, according to some embodiments. In FIG. 4, DRAM bank 402 is initially partitioned into 8 equal-sized address ranges or sub-banks, sub-bank 0 . . . 7. Each of these 8 equal-sized sub-banks is assigned a counter. The number 8 might be chosen, for example, because LPDDR4 has a fixed number of 8 banks defined by JEDEC, and this is followed by many DRAM vendors.

Once these 8 sub-banks are assigned, as detailed in block 302 of FIG. 3, then the target application can be run to get the activate count for each sub-bank, as detailed in block 304 of FIG. 3. Referring back to FIG. 4, the length of the arrows underneath each of the sub-banks 0 . . . 7 in DRAM bank 402 signify the activate count for that sub-bank after the running of an application. The longer the arrow underneath each of the sub-banks, the larger the activate count for that sub-bank.

Then, as detailed in block 306 of FIG. 3, the address range associated with one or more of the sub-banks in FIG. 4 is adjusted in order to expand or shrink the size of the address space associated with those sub-banks, in order to level the activate count. DRAM bank 404 depicts the adjusted sizes of the sub-banks 0 . . . 7 of DRAM bank 402. For example, because sub-bank 1 in DRAM bank 402 has a very high activate count compared to the other sub-banks, sub-bank 1 is split into two sub-banks-sub-banks 1 and 2 in DRAM bank 404.

In addition, sub-banks 2 and 3 in DRAM bank 402 is combined into one sub-bank 3 in DRAM bank 404, because those sub-banks have a lower activate count. In addition, sub-banks 5 and 6 in DRAM bank 402 is combined into one sub-bank 5 in DRAM bank 404, because those sub-banks have a lower activate count. In addition, sub-bank 7 is split into two sub-banks-sub-banks 6 and 7 in DRAM bank 404, because sub-bank 7 in DRAM bank 402 has a very high activate count compared to some of the other sub-banks. The sub-banks of DRAM bank 404 have activate counts that are more level with each other.

As mentioned in block 308 of FIG. 3, this process depicted in FIG. 4 can be repeated until the activate count in each counter is appropriately leveled to a desired level range. Depending on the level of optimization a user wants to obtain, the number of iterations could be different. However, in some embodiments, the optimization levels are expected to flatten out after 2 or 3 iterations of running the applications. This process, as depicted in FIGS. 3 and 4, allows more counting space for each counter, and in turn more time to react with a resolution.

Figure 5:
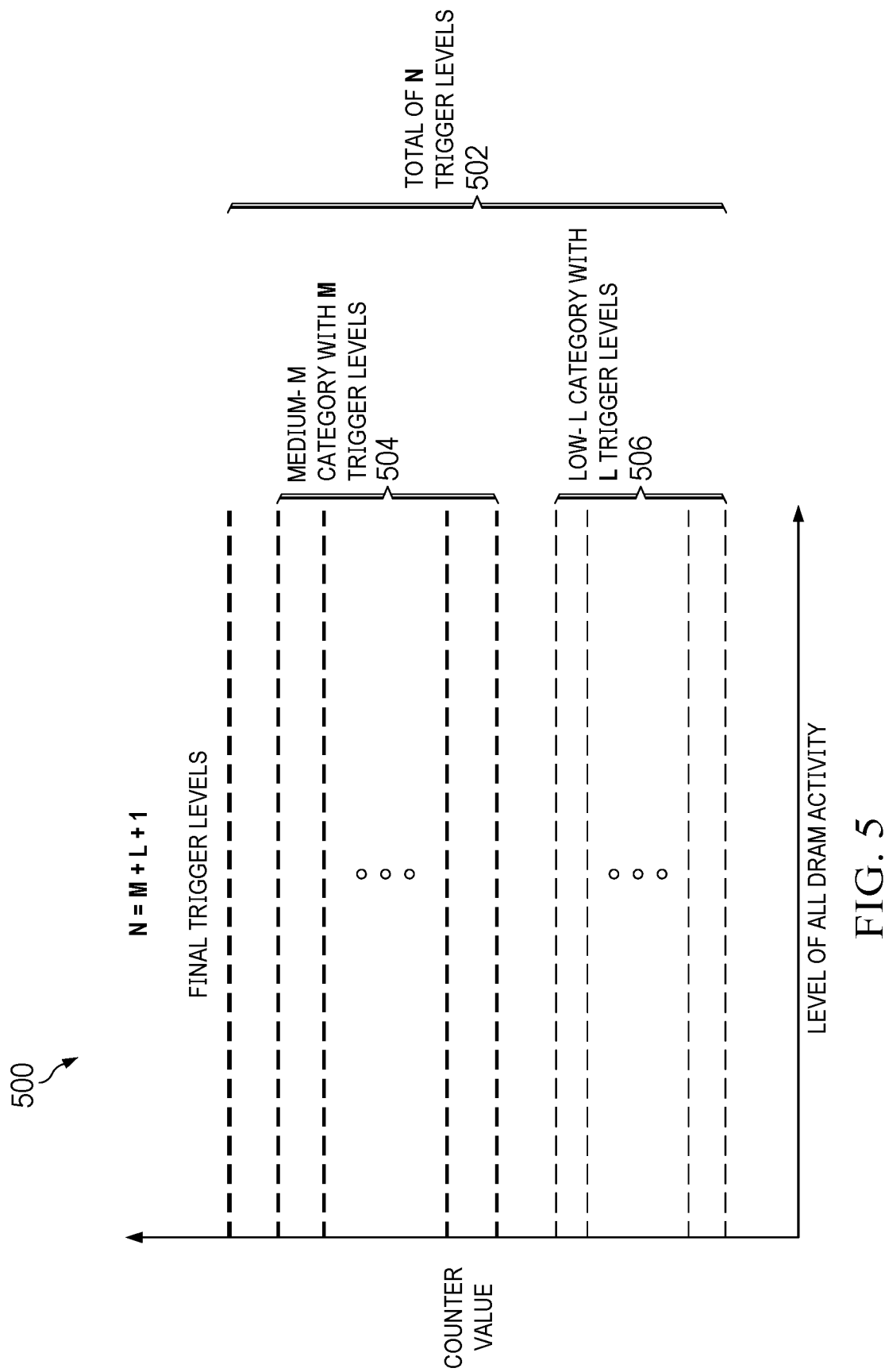
FIG. 5 depicts a multi-layer prevention scheme to mitigate RowHammering exploitations, according to some embodiments.

FIG. 5 depicts a multi-layer prevention scheme (500) to mitigate RowHammering exploitations, according to some embodiments. Particularly, FIG. 5 depicts the multi-layer prevention scheme with multiple categories and multiple trigger levels within each category.

In FIG. 5, a total of N trigger levels (502) can be assigned. These N trigger levels (502) can be broken into categories of: a low L-category (506) with L trigger levels (e.g., a yellow category having yellow trigger lines), and a medium M-category (504) with M trigger levels (e.g., an orange category having orange trigger lines). Then, a final high category with 1 trigger level can also be assigned (e.g., a red category having a red trigger line). Each trigger level corresponds to a threshold count value of activate commands. In some implementations, the total number of trigger levels N can be M (the number of trigger levels in the medium category) plus L (the number trigger levels in the low category) plus 1 (the number of trigger levels in the high category). In one embodiment, each category of trigger levels corresponds to a different method of mitigating RowHammering. For example, reaching the lowest level triggers (the L triggers of the L-category) results in changing parameters to slow the hammering attacks, while reaching the medium level triggers (the M triggers of the M-category) results in changing parameters to narrow the time window of the hammering attacks. Reaching the highest level trigger stops the hammering attacks.

In some embodiments, at least one of the activate counts obtained from at least one of the counters during the target application modeling (described previously with regard to FIGS. 3 & 4) may be assigned to the first trigger level of L-category. In other words, when the number of activate commands for a segment of DRAM meets or exceeds the number of activate commands that should occur, as determined by the activate counts obtained from the target application modeling, then the triggering and the corresponding mitigation techniques can begin. The number of activate commands that correspond to the other trigger levels of the L-category, and the number of activate commands that correspond to the other trigger levels of the M-category can also be set using data from the target application modeling, in some embodiments.

A trigger can be considered a "count value threshold", in some embodiments, such that when any one counter of the m counters reaches a trigger, then the mitigation steps are taken for that trigger. In addition, in these embodiments, as soon as any of the m counters reaches the next lowest trigger, then the mitigation steps are taken for that next lowest trigger. For example, when each trigger level of the lowest level triggers (the L triggers of the L-category) is reached, then timing parameters may be in increased from their previous values.

Some examples of timing parameters that can be increased are tRAS, which is the minimum time between an activate and a subsequent precharge command for a given row, and tRP which is the minimum precharge command period. In other words, tRAS provides the minimum time from activation to close of a wordline, and tRP provides the minimum time to re-activate a wordline that has been closed. Therefore, in some embodiments, the values of tRAS and tRP timing parameters may be increased. In some embodiments, when the tRAS and tRP timing parameters are doubled in value, then the first trigger of the next trigger category M will begin.

Referring now to the next trigger category M, when each trigger of the M category triggers is reached, the frequency of refreshes of the memory banks may be increased. The frequency of refreshes of the memory banks may be increased until the refreshes are issued at 4 times the starting rate, in some of these embodiments. After the refreshes are issued at 4 times the starting rate, in these embodiments, then the final trigger will begin.

The final trigger, in some embodiments, is the red-line trigger when one or more of the counters reach close to the maximum allowed number of activate commands. When the final trigger is reached, in some embodiments, the memory controller will direct all the activate commands to stop. When the maximum number of activate commands approaches near the value that RowHammering can occur, then to prevent a bit flip, the memory controller stops issuing any activate commands until a refresh time limit has passed and the counters restart.

In some embodiments, a refresh time limit is 64 ms. For example, JEDEC has defined 64 ms as the maximum allowed time before a refresh of all the rows in a DRAM needs to occur. In order to be successful, a RowHammer attack or event needs to accomplish its task before the rows are refreshed.

Figure 6:
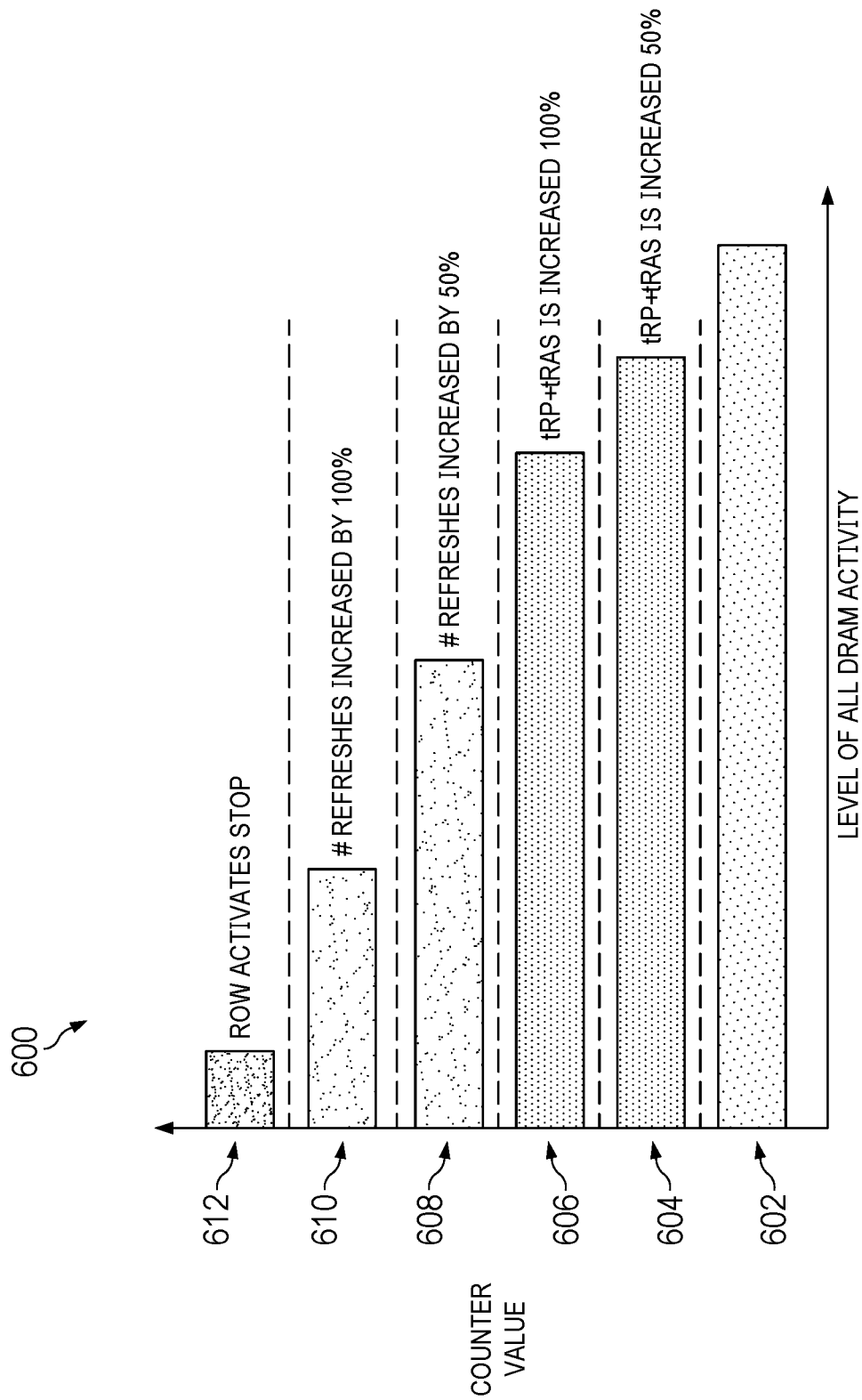
FIG. 6 depicts a specific example of multi-layer prevention scheme to mitigate RowHammering exploitations, according to some embodiments.

FIG. 6 depicts a specific example (600) of multi-layer prevention scheme to mitigate RowHammering exploitations, according to some embodiments. In the example of FIG. 6, a total of 5 mitigation levels (604-612) are implemented, corresponding to 5 trigger levels. The horizontal axis depicts the level of all DRAM activity, and the vertical axis depicts any given counter value for at least one counter of the m counters. In this example, there are 2 trigger levels from the low L-category (i.e., the yellow category) (604, 606), 2 trigger levels from the medium M-category (i.e., the orange category) (608, 610), with the last trigger level is from the final category (i.e., the red category) (612). FIG. 6 depicts the level of activity to the DRAM decreases as the mitigation techniques are increasingly applied by the various trigger levels. The bottom horizontal bar (602) depicts the most amount of DRAM activity when no mitigation techniques are applied.

When any one counter of the m counters reaches a count value for the first trigger level, depicted as the dashed horizontal line between 602 and 604, then the mitigation techniques of the first L-category level is applied. In the first L-category trigger level (604) the tRP and tRAS are increased by 50%. FIG. 6 shows that the level of all DRAM activity decreases when this first mitigation technique is applied (604). Then when any one counter of the m counters reaches a count value for the second trigger level, depicted as the dashed horizontal line between 604 and 606, then the mitigation techniques of the second L-category level is applied. In this second L-category trigger level (606) the tRP and tRAS are increased by 100%. At the next two M-category levels (608, 610) within the M-category, the number of refreshes is increased by 50% at the first trigger level, and then by 100% at the second trigger level of the M-category. When any one counter of the m counters reaches a count value for the final trigger level, depicted as the dashed horizontal line between 610 and 612, then the mitigation techniques of the final-category (612) are applied. In the final category (612) the row activations will stop until a refresh operation refreshes of all the rows to be refreshed in response to a refresh command, and the new DRAM cycle begins, in this example. This "critical level" may be defined in a software-writable configuration register, in some embodiments.

Figure 7:
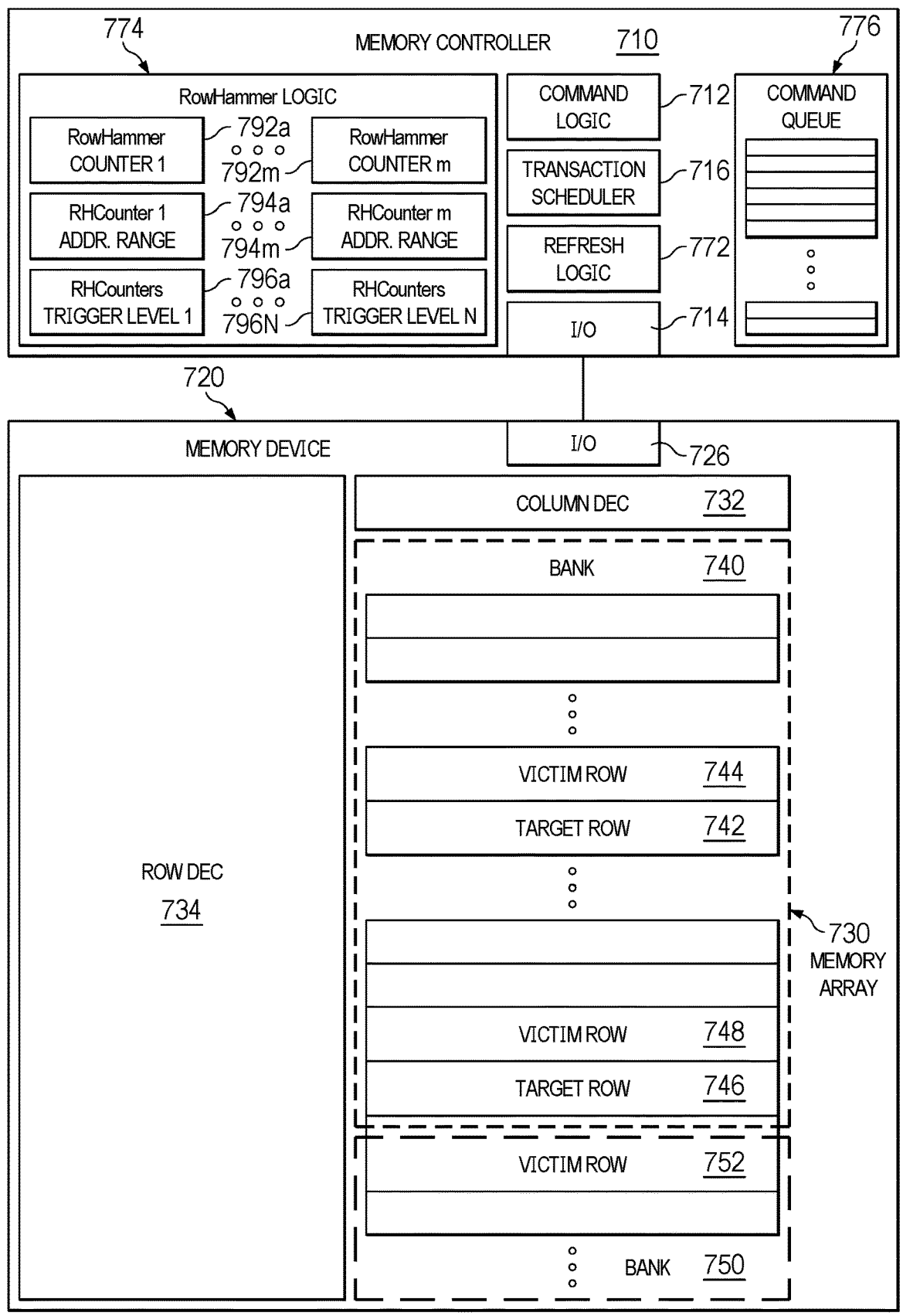
FIG. 7 is a block diagram of an embodiment of a system including a memory controller and a memory device that performs RowHammer mitigation, according to some embodiments.

FIG. 7 is a block diagram of an embodiment of a system including a memory controller and a memory device that performs RowHammer mitigation, according to some embodiments. The system includes memory device 720 coupled to memory controller 710, which could also be referred to as a host controller, or simply, a controller. Memory device 720 can include any type of memory technology that has adjacent rows of memory cells, where data is accessible via a wordline or the equivalent. In an example, memory device 720 includes DRAM technology. The rows of memory device 720 need to be refreshed to maintain deterministic state, in some embodiments.

Memory device 720 includes memory array 730, which represents an array of memory cells or storage cells. A memory cell stores a bit of data, or multiple bits for a multi-level cell. Memory array 730 includes a representation of potential RowHammer situations. For purposes of example, memory array 730 shows bank 740 and bank 750. It will be understood that memory array 730 can include multiple banks. In general, a bank or a sub-bank of memory includes memory cells that are addressable separately from memory cells of another bank or sub-bank, and are thus accessible in parallel to another portion of memory array 730. Memory array 730 can include portions not illustrated in system 700.

Memory device 720 includes column decoder 732 which represents circuitry to apply charge to a column based on an access command. In one example, the circuitry selects a column in response to a column address strobe (CAS) command. Memory device 720 includes row decoder 734 which represents circuitry to apply selection voltages to rows based on a memory access command. In one example, the circuitry selects a row in response to a row address strobe (RAS) command.

Memory controller 710 includes command logic 712 to generate commands for memory device 720. Commands can include commands such as Write commands or Read commands. Commands can also include Activate commands, Precharge commands, Refresh commands, or other commands. In one example, memory controller 710 includes refresh logic 772, which represents logic to control the refreshing of memory device 720. Refresh logic 772 can include one or more counters to determine the need for refresh of memory device 720 and register space to track the sending of refresh commands.

Refresh commands can include external refresh commands (e.g., REF, REFpb) where the memory device continues to operate in accordance with a clock signal from memory controller 710. Refresh commands can also include a self-refresh command (e.g., SRE) where the memory device operates on an internal clock instead of based on a clock signal from the memory controller. An external refresh has a specific window for completion of the command, and self-refresh is a state in which the memory device can be, for a non-specific amount of time.

Memory controller 710 includes transaction scheduler 716 to manage the scheduling and sending of sequences of commands to memory device 720. Transaction scheduler 716 includes logic to determine the order of commands, as well as timing requirements for the commands. Memory controller 710 may make determinations of what commands to send. It will also make determinations of the order of commands to ensure compliance with timing requirements.

Transaction scheduler 716, in some embodiments, can enable memory controller 710 to make certain determinations regarding commands and timing. In other embodiments, the transaction scheduler doesn't generate the refresh command, but instead only passes the read/write requests to the command queue 776. In one example, transaction scheduler 716 determines how many external refresh commands to send during a refresh window. Transaction scheduler 716 can generate extra refresh commands to enable RowHammer mitigation, according to some embodiments.

For instance, in the example of FIG. 6, transaction scheduler 716 can generate additional refreshes when the two medium M-category trigger levels have been triggered (i.e. reached). The transaction scheduler 716 can increase the number of refreshes by 50% when the first level has been reached, and then the transaction scheduler 716 can increase the number of refreshes by 100% when the second trigger level of the M-category has been reached. Of course, as explained with regard to FIG. 5, a medium M-category (504) can have M trigger levels. Therefore, in other embodiments, there can be one M-category trigger level, or there can be more than two medium M-category trigger levels. Each potential trigger level can result in increasing the number of refreshes by a certain percentage, where that percentage might be more than 100%, depending on the embodiment. In another embodiment, the M medium M-category (504) trigger levels can be separate predefined scaling factors.

In an example, memory controller 710 includes Row-Hammer (RH) logic 774 to enable the controller to determine when a threshold number of activate commands or activates have been sent to memory device 720. For instance, RowHammer logic 774 can include one or more counters 792a ... 792m, or other logic to monitor potential RowHammer conditions.

In some embodiments, the RowHammer logic 774 includes a comparator to determine when one of the RH activate counters 792a ... 792m has reached one of the N trigger levels 796a ... 796N. RowHammer logic 774 also includes another comparator to determine which RH Counter 792a ... 792m to increase for a given transaction, by comparing the address of a transaction to the address ranges in the appropriate RHCounter Address Range registers 794a ... 794m. Each counter 792a ... 792m has an address range 794a ... 794m assigned to it, which corresponds to the rows of the DRAM bank it is associated with. For example, RH Counter 792a is associated with the address range in RH Counter Address Range 794a. RH Counter 792a keeps a count of the number of activate commands that have been scheduled for the addresses within the address range defined by the RH Counter Address Range 794a.

As explained by the procedure detailed by FIGS. 3 and 4, these N trigger levels 796a ... 796N and m address ranges 794a ... 794m (with 1 address range per counter) may be programmable, in some embodiments. FIGS. 3 and 4 depict how an application's or user's use of DRAM may be profiled, and how the monitoring may then be optimized to better target DRAM rows used by the actual application or user.

Memory controller 710 can obtain the configuration information that is output by step 310 of FIG. 3, for example, and use it to store the appropriate values in the N trigger level registers 796a ... 796N and the m address range registers 794a ... 794m. These registers can be internal to memory controller 710 and the RH Logic 774, in some embodiments. As a reminder, in block 310 of FIG. 3, the final address range associated with each of the m counters of each bank, as well as the count values for each of the m counters of each bank, are stored as the expected activity or target application model. Therefore, the final address range associated with each of the m counters may be stored in the m address range registers 794a ... 794m of FIG. 7.

The count values for each of the m counters of each bank can be used to determine the counts for the N trigger level registers 796a ... 796N of FIG. 7. This configuration can be done before the user uses the memory device 720, or before an application has begun accessing the memory device 720, in some embodiments.

Memory controller 710 also includes I/O (input/output) hardware 714. I/O 714 represents transceivers and signal line interface hardware to enable memory controller 710 to connect to memory device 720 over one or more buses. I/O 714 enables memory controller 710 to send commands to memory device 720. Memory controller 710 includes command queue 776, which buffers a sequence of commands to send to memory device 720. In one example, command queue 776 is part of transaction scheduler 716. Transaction scheduler 716 determines the commands and the order of commands to send, which can then be queued up in command queue 776 for transmission via I/O 714.

For an illustration of a RowHammer condition, memory array 730 includes target row 742 in bank 740. A physically proximate row or a physically adjacent row can suffer from unintentional programming or disturb of one or more values stored in the row based on repeated access to target row 742 within a time period prior to a refresh operation on the row. Victim row 744 represents a row that is subject to Row-Hammer when target row 742 is repeatedly accessed. When victim row 744 is at risk of a RowHammer event, target row 742 can be referred to as an aggressor row. There may be another row in bank 740 that is a victim row to target row 742.

In an example, bank 740 also includes target row 746. Consider that target row 746 is at or near a bank boundary. It will be understood that the rows in memory array 730 may have a spacing that is not different even if the rows are in different banks. Rather, the separation of one bank to another can be defined by selection or decode hardware elements. Thus, depending on the architecture of the physical layout of the rows, a row on the boundary of bank 750 could also be at risk for a RowHammer event based on access to target row 746.

In another example, repeated access to a target row can cause a disturbance of multiple adjacent rows. In as illustrated, target row 746 can result in RowHammer events to both victim row 748 of bank 740 and victim row 752 of bank 750.

Memory device 720 includes I/O 726 to interface with I/O 714 of memory controller 710. I/O 726 has corresponding signal lines to I/O 714 to receive commands and address information to receive activate and refresh commands, among other commands. In one example, I/O 726 includes an interface to a data bus to exchange data with memory controller 710.

Using the example of FIG. 6, the RH Logic 774 can increase the tRP and tRAS by 50% in the first level of the L-category levels, and then by 100% in the second level of the L-category levels. Then, the RH Logic 774 can increase the number of refreshes by 50% in the first level of the M-category, and then by 100% in the second level of the M-category. When any one counter of the m RH activate counters 792a ... 792m reaches a count value for the final trigger level N (796N) (also depicted as the dashed horizontal line between 610 and 612 in FIG. 6), then the mitigation techniques of the final-category are applied. In this final-category, the RH Logic 774 can stop the row activates until the new DRAM refresh cycle arrives, in this example.

In an example, refresh logic 772 will schedule more refresh operations than necessary in a refresh period. As described, RowHammer logic 774 can provide extra or excess refreshes for refresh logic to use for RowHammer mitigation, based on the number of activates sent to predetermined sub-banks of memory device 720, as detailed by FIGS. 5 and 6.

In response to an external refresh command, memory device 720 typically performs refresh of multiple rows. The refresh operation refers to the refresh of all the rows to be refreshed in response to a single refresh command. The refresh operation has a time tRFC (row refresh cycle time), and there will be an average refresh interval of tREFI (refresh interval time) between refresh operations in the refresh period or refresh window. The refresh period refers to a time between refreshes of any given row to avoid loss of data in the row. In some embodiments, a refresh can refer to the refresh of a single row of all the rows to be refreshed in response to the refresh command, and has a time less than tRFC since a single refresh operation includes multiple refreshes.

It will be understood that there can be multiple target rows in the same bank, such as what is illustrated in bank 740. As the number of activate commands required to cause a RowHammer attack continues to decrease, the number of potential aggressor rows will increase. Thus, the number of RowHammer mitigation operations needed per refresh period continues to increase. To permit more RowHammer mitigation operations, memory controller 710 can send more external refresh commands, in some embodiments, based specifically on determining how many activate commands have been sent and the corresponding trigger levels.

Refresh (whether external or internal) is a time the memory controller and memory device can ensure that there will be no access to a row. It will be understood that different banks can be refreshed at different times, and thus be unavailable for access at different times. Banks not being refreshed can be accessed, and thus, transaction scheduler 716 will manage the scheduling of refreshes of different banks.

RowHammer logic 774 of memory controller 710 can keep track of the number of activate commands sent to memory device 720 to trigger the sending of additional refresh commands. Such a mechanism is much simpler than having memory device 720 keep track of the need for additional refreshes and trying to signal the memory controller.

When RowHammer logic 774 keeps track of the thresholds for sending excess refreshes, the operation can be performed based on configurable parameters, in some embodiments. Such an approach enables configurability for different operating conditions, for different devices or manufacturers, or other variables that can affect the need for additional RowHammer mitigation.

The granularity of RowHammer mitigation tracking can be dependent on the implementation. In general, the granularity depends on the level at which monitoring is performed. In one example, the monitoring is performed at the device level. In one example, the monitoring is performed at the channel level. In one example, the monitoring is performed at the rank. In one example, the monitoring is performed at the bank group. In one example, the monitoring is performed at the bank.

Figure 8:
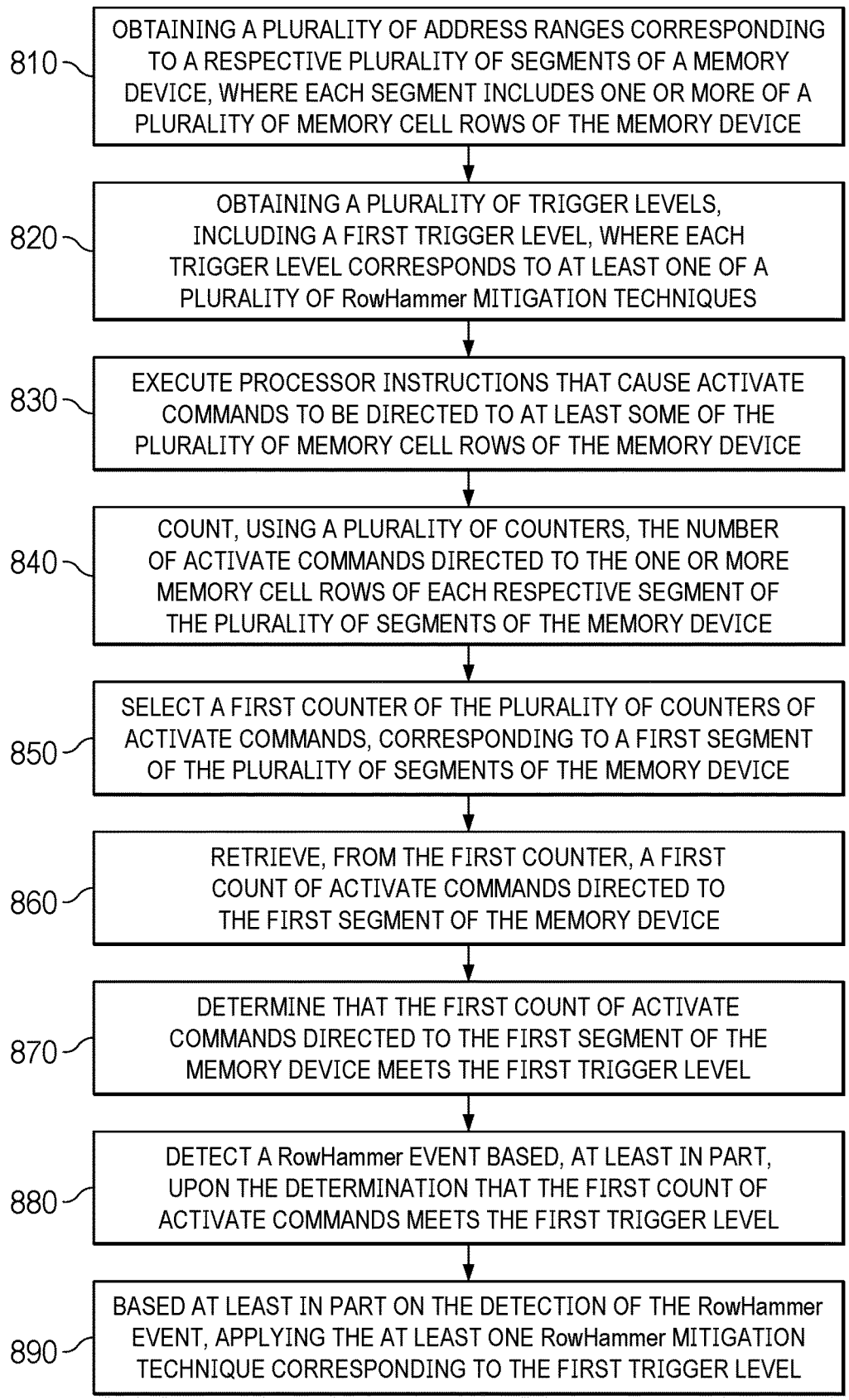
FIG. 8 is a flowchart of a method for detecting and mitigating RowHammer exploitations in an operational environment, according to some embodiments.

FIG. 8 is a flowchart of a method for detecting and mitigating RowHammer exploitations in an operational environment, according to some embodiments. The flowchart begins at 810, which obtaining a plurality of address ranges corresponding to a respective plurality of segments of a memory device, where each segment includes one or more of a plurality of memory cell rows of the memory device. These address ranges can be stored in the m address range registers 794a . . . 794m of FIG. 7. The flowchart transitions to block 820 which obtains a plurality of trigger levels, including a first trigger level, where each trigger level corresponds to at least one of a plurality of RowHammer mitigation techniques. These trigger levels can be stored in the N trigger level registers 796a . . . 796N of FIG. 7.

The flowchart transitions to block 830 where processor instructions are executed that cause activate commands to be directed to at least some of the plurality of memory cell rows of the memory device. Then at block 840, the RowHammer logic counts, using the m RH activate counters 792a . . . 792m of FIG. 7, the number of activate commands directed to the one or more memory cell rows of each respective segment of the plurality of segments of the memory device. The segments can be defined by the m address range registers 794a . . . 794m of FIG. 7. The system then determines whether any one of the counters has reached a trigger level. First, the m counters are monitored until one of them reaches trigger level 1, at which point, mitigation techniques for trigger level 1 are employed. Then the m counters continue to count from their current values until one of them reaches trigger level 2, at which point mitigation techniques for trigger level 2 are employed, etc.

The remainder of FIG. 8 details an example of selecting a counter, retrieving the count from that counter, and discovering that the count meets or exceeds a trigger level. Once the count meets or exceeds a trigger level, then mitigation techniques are employed. Therefore, block 850 selects a first counter of the plurality of counters of activate commands (792a . . . 792m of FIG. 7), corresponding to a first segment of the plurality of segments of the memory device (the m address range registers 794a . . . 794m of FIG. 7). The flowchart transitions to block 860 which retrieves, from the first counter, a first count of activate commands directed to the first segment of the memory device. Block 870 then determines that this first count of activate commands directed to this first segment of the memory device meets the first trigger level. At block 880, the flowchart detects a RowHammer event based, at least in part, upon the determination that the first count of activate commands meets the first trigger level. Finally at block 890, based at least in part on the detection of the RowHammer event, the method applies at least one RowHammer mitigation technique corresponding to the first trigger level.

Figure 9:
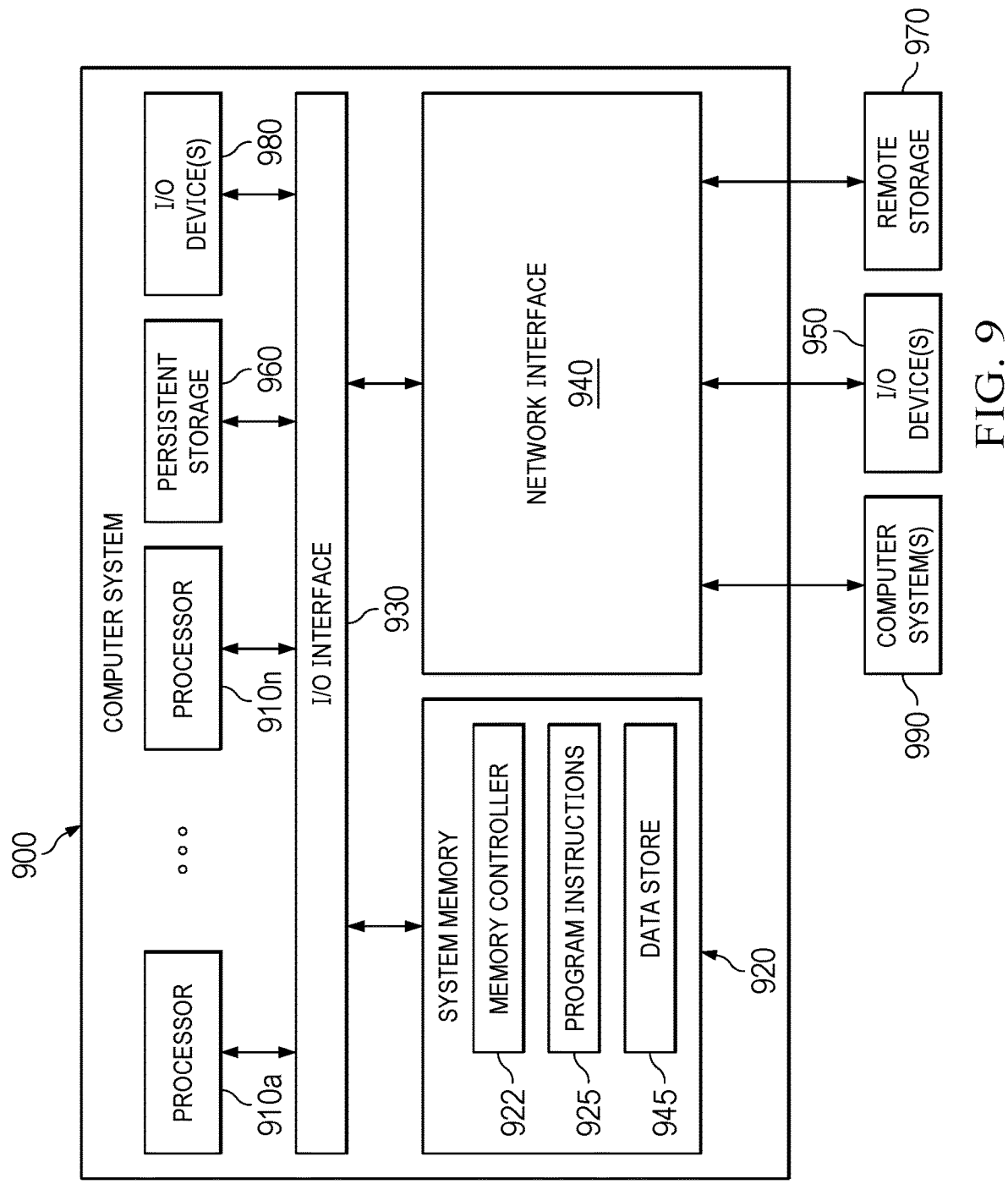
FIG. 9 is a block diagram illustrating an example computer system, according to various embodiments.

Example Computer System for Adaptively Detecting and Mitigating RowHammer Attacks or Events Embodiments for adaptively detecting and mitigating RowHammer attacks or events as described herein may be executed on one or more computer systems, which may interact with various other devices. FIG. 9 is a block diagram illustrating an example computer system, according to various embodiments. For example, computer system 900 may be configured to implement nodes of a provider network, such as may implement various resources, a control plane, or diagnostic agents, and/or a client, in different embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, compute node, or computing node.

Computer system 900 includes one or more processors 910a . . . 910n (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910a, or a multiprocessor system including several processors 910a . . . 910n (e.g., two, four, eight, or another suitable number). Processors 910a . . . 910n may be any suitable processors capable of executing instructions. For example, in various embodiments, processors 910a . . . 910n may be general-purpose or embedded processors implementing any of a variety of instruction set architectures (ISAs), such as the x86, PowerPC, SPARC, or MIPS ISAs, or any other suitable ISA. In multiprocessor systems, each of processors 910a . . . 910n may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement one or more of the components of the system described herein. In another example, an instance of a server application executing on computer system 900 may use network interface 940 to communicate with other instances of the server application (or another server application) that may be implemented on other computer systems (e.g., computer systems 990).

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may host a storage system server node, and persistent storage 960 may include the SSDs attached to that server node.

Computer system 900 includes one or more system memories 920 that are configured to store instructions and data accessible by processor(s) 910a . . . 910n. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910a . . . 910n to implement the methods and techniques described herein. In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement the functionality of adaptively detecting and mitigating RowHammer attacks or events, in different embodiments. In some embodiments, program instructions 925 may implement multiple separate clients, nodes, and/or other components. System memory 920 can also include one or more memory controllers 922 operable to perform one or more of the embodiments described herein for adaptively detecting and mitigating RowHammer attacks or events. The memory controller 922 can be configured as described for the memory controller 710 in FIG. 7. The memory controller 922 can include RowHammer Logic as disclosed in component 774 of FIG. 7. The registers of this RowHammer logic can be configured by the one or more of the processors 910a . . . 910n in accordance with the embodiments described for FIGS. 3-7 above.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured as described herein. In general, system memory 920 (e.g., data store 945 within system memory 920), persistent storage 960, and/or remote storage 970 may store data blocks, replicas of data blocks, metadata associated with data blocks and/or their state, configuration information, and/or any other information usable in implementing the methods and techniques described herein.

In one embodiment, I/O interface 930 may be configured to coordinate I/O traffic between processors 910a . . . 910n, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor(s) 910a . . . 910n). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor(s) 910.

Network interface 940 may be configured to allow data to be exchanged between computer system 900 and other devices attached to a network, such as other computer systems 990 (which may implement one or more nodes, endpoints, systems, or services internal to or external to a provider network, and/or clients of the provider network described herein), for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks via any suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.).

The components of the computer system 900 may for example be implemented on a single chip. The computer system 900 may be a chip card (or a chip card module) powered by direct electrical contact or through an electromagnetic field. The computer system 900 may be a fixed circuit or based on reconfigurable hardware (e.g., Field Programmable Gate Array, FPGA). The computer system 900 may be coupled to a personal computer, microcontroller, FPGA or a smart phone System on a Chip (SoC) or other components of a smart phone. The computer system 900 may be a chip that acts as Trusted Platform Module (TPM) offering functionality (secure storage, secure time, signature generation and validation, attestation) according to a standardized interface to a computer, smart phone, Internet of Things (IoT) device, or car.

It is noted that any of the distributed system embodiments described herein, or any of their components, may also be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

As such, systems and methods for adaptively detecting and mitigating RowHammer attacks or events against computer memories have been described. In an illustrative, non-limiting embodiment, a system, may include: a memory controller; and a RowHammer detection circuit coupled to the memory controller, the RowHammer detection circuit configured to: receive a count of activate commands for a segment of a memory device, where the segment comprises one or more of a plurality of memory cell rows; and detect a RowHammer event based, at least in part, upon a determination that the count of activate commands meets at least one of a plurality of trigger levels.

In some embodiments, to receive the count of activate commands, the RowHammer detection circuit can be configured to: select at least one of a plurality of counters of activate commands, wherein the selected counter corresponds to an address of the segment; and retrieve, from the counter, the count of the activate commands. In some embodiments, the plurality of trigger levels comprises three or more trigger levels. In some embodiments, the RowHammer detection circuit can be configured to select at least one of a plurality of mitigation actions, and where each of the mitigation actions corresponds to a different trigger level.

In some embodiments, the RowHammer detection circuit can be further configured to: execute instructions of a target application, wherein the instructions cause activate commands to be sent to the memory device; receive a plurality of counts of activate commands, each count corresponding to a respective one of a plurality of initial segments of the memory device; determine that a difference between a first count of activate commands directed to a first initial segment and a second count of activate commands directed to a second initial segment can be outside of a selected range; in response to the determination, modify a size of the first initial segment to define a first adjusted segment and modify a size of the second initial segment to define a second adjusted segment; and in response to a difference between a first adjusted count of activate commands corresponding to the first adjusted segment and a second adjusted count of activate commands corresponding to the second adjusted segment being within the selected range, detect the RowHammer event in at least one of the first or second adjusted segments.

In other non-limiting embodiments, a method, can comprise: detecting a RowHammer event based, at least in part, upon a determination that a count of activate commands for a segment of a memory device meets at least one of a plurality of trigger levels; and applying at least one of a plurality of RowHammer mitigation techniques, wherein each of the plurality of RowHammer mitigation techniques corresponds to at least one of the plurality of trigger levels.

In some embodiments, the method can include applying at least one of the plurality of RowHammer mitigation techniques comprises adjusting one or more timing parameters. In some embodiments, adjusting the one or more timing parameters can include increasing the one or more timing parameters by at least one of a plurality of predefined values, and each of the predefined values can corresponds to a different trigger level. In some embodiments, the one or more timing parameters comprise at least one of: a minimum time between an activate and a subsequent precharge command, or a minimum time to re-activate a closed wordline. In some embodiments, applying at least one of the plurality of RowHammer mitigation techniques can comprise adjusting a frequency of refreshes.

In some embodiments, the method can include adjusting the frequency of refreshes of the memory device at least in part, in response to a first threshold count value of activate commands having been reached. In some embodiments, the adjusting the frequency of refreshes can include increasing a frequency of refreshes by at least one of a plurality of predefined values, and each of the predetermined values can correspond to a different trigger level. In some embodiments, the predetermined values comprise up to four times a starting refresh rate. In some embodiments, the applying at least one of the plurality of RowHammer mitigation techniques can include stopping a subsequent activate command from reaching the memory device. In some embodiments, the method can include stopping the subsequent activate command, at least in part, in response to a second threshold count value of activate commands having been reached. In some embodiments, the second threshold count value of activate commands can be greater than the first threshold count value of activate commands. In some embodiments, stopping the subsequent activate command can include stopping any subsequent activate command at least until a refresh time period end.

In other non-limiting embodiments, a device can comprise one or more electronic circuits, the device configured to: execute instructions of a target application, wherein the instructions cause activate commands to be sent to a dynamic random-access memory (DRAM), wherein the DRAM comprises a plurality of memory cell rows; determine a plurality of counts of the activate commands directed to a respective plurality of segments of the DRAM, wherein each segment comprises one or more of the plurality of memory cell rows; determine that a first count of the activate commands directed to a first segment, and a second count of the activate commands directed to a second segment, are not within a desired leveling range; adjust the size of the first and second segments to define an adjusted first segment and an adjusted second segment of a plurality of adjusted segments; determine that an adjusted first count of the activate commands corresponding to the adjusted first segment can be within a desired leveling range of an adjusted second count of the activate commands corresponding to the adjusted second segment; and provide memory address ranges corresponding to the plurality of adjusted segments to a memory controller.

In some embodiments, the one or more electronic circuits are further configured to determine, based at least in part on the adjusted first count of the activate commands, a plurality of trigger levels for a plurality of counters of activate commands. In some embodiments, the one or more electronic circuits are further configured to: determine, during a second execution of a same or different target application that causes the activate commands to be sent to one or more same or different DRAM devices, a third count of the activate commands corresponding to the adjusted first portion of the memory rows; and detect a RowHammer event based, at least in part, upon a determination that the third count has reached a particular trigger level the plurality of trigger levels.

In various embodiments, systems and methods described herein may provide for adaptively detecting and mitigating RowHammer attacks or events in a System-On-a-Chip (SoC), Field-Programmable Gate Array (FPGA), Application-Specific Integrated Circuit (ASIC), or any other suitable data processing system comprising a plurality of discrete circuits or semiconductor Intellectual Property (IP) cores (collectively referred to as "SoC devices" or simply "devices") disposed in a single electronic or semiconductor package.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow. It is intended that the following claims be interpreted to embrace all such modifications and changes and, accordingly, the above description to be regarded in an illustrative rather than a restrictive sense.

The previous detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined circuits or logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system, comprising:
a memory controller; and
a RowHammer detection circuit coupled to the memory controller, the RowHammer detection circuit configured to:
in response to execution of instructions of a target application, wherein the instructions cause activate commands to be sent to the memory device, receive a plurality of counts of activate commands, each count corresponding to a respective one of a plurality of initial segments of a memory device;
determine that a difference between a first count of activate commands directed to a first initial segment and a second count of activate commands directed to a second initial segment is outside of a selected range;
in response to the determination, modify a size of the first initial segment to define a first adjusted segment and modify a size of the second initial segment to define a second adjusted segment;
in response to a difference between a first adjusted count of activate commands corresponding to the first adjusted segment and a second adjusted count of activate commands corresponding to the second adjusted segment being within the selected range;
receive a count of activate commands for a segment of a memory device, wherein the segment comprises one or more of a plurality of memory cell rows; and
detect a RowHammer event in at least one of the first or second adjusted segments based, at least in part, upon a determination that the count of activate commands meets at least one of a plurality of trigger levels.

2. The system of claim 1, wherein to receive the count of activate commands, the RowHammer detection circuit is configured to:
select at least one of a plurality of counters of activate commands, wherein the selected counter corresponds to an address of the segment; and
retrieve, from the counter, the count of the activate commands.

3. The system of claim 1, wherein the plurality of trigger levels comprises three or more trigger levels comprising at least one trigger level corresponding to a lower category of the activate command counts, at least one trigger level corresponding to a medium category of the activate command counts, and at least one trigger level corresponding to a final category of a most allowed count of the activate commands.

4. The system of claim 1, wherein the RowHammer detection circuit is configured to select at least one of a plurality of mitigation actions, and wherein each of the mitigation actions corresponds to a different trigger level.

5. A device comprising one or more electronic circuits, the device configured to:
execute instructions of a target application, wherein the instructions cause activate commands to be sent to a dynamic random-access memory (DRAM), wherein the DRAM comprises a plurality of memory cell rows;
determine a plurality of counts of the activate commands directed to a respective plurality of segments of the DRAM, wherein each segment comprises one or more of the plurality of memory cell rows;
determine that a first count of the activate commands directed to a first segment, and a second count of the activate commands directed to a second segment, are not within a desired leveling range;
adjust the size of the first and second segments to define an adjusted first segment and an adjusted second segment of a plurality of adjusted segments;
determine that an adjusted first count of the activate commands corresponding to the adjusted first segment is within a desired leveling range of an adjusted second count of the activate commands corresponding to the adjusted second segment; and provide memory address ranges corresponding to the plurality of adjusted segments to a memory controller.

6. The device of claim 5, wherein the one or more electronic circuits are further configured to determine, based at least in part on the adjusted first count of the activate commands, a plurality of trigger levels for a plurality of counters of activate commands.

7. The device of claim 6, wherein the one or more electronic circuits are further configured to:

determine, during a second execution of a same or different target application that causes the activate commands to be sent to one or more same or different DRAM devices, a third count of the activate commands corresponding to the adjusted first portion of the memory rows; and detect a RowHammer event based, at least in part, upon a determination that the third count has reached a particular trigger level among the plurality of trigger levels.

8. A system, comprising:

a dynamic random-access memory (DRAM) having a plurality of segments, each segment defined by an address range of the DRAM; and a memory controller coupled to the DRAM, the memory controller having a RowHammer detection circuit comprising:

a plurality of counters, each counter configured to count activate commands to a corresponding segment of the plurality of segments;

a plurality of trigger level registers configured to store a plurality of trigger levels, the plurality of trigger levels corresponding to increasing count values, in which each trigger level corresponds to a different mitigation technique;

wherein the RowHammer detection circuit is configured to, in response to instructions of a target application being executed, wherein the instructions cause activation commands to be sent to the DRAM, profile the DRAM by:

determining a plurality of counts of the activate commands directed to a respective plurality of initial segments of the DRAM, wherein each initial segment comprises a same number of memory cell rows;

determine that a first count of the activate commands directed to a first initial segment, and a second count of the activate commands directed to a second initial segment, are not within a desired leveling range;

adjust the size of the first and second initial segments to define an adjusted first segment and an adjusted second segment of a plurality of adjusted segments;

determine that an adjusted first count of the activate commands corresponding to the adjusted first segment is within a desired leveling range of an adjusted second count of the activate commands corresponding to the adjusted second segment; and provide memory address ranges corresponding to the plurality of adjusted segments as the assigned address ranges for each counter of the plurality of counters;

wherein the RowHammer detection circuit is further configured to, after profiling the DRAM:

determine that a count value of any first one of the plurality of counters has reached a first trigger level of the plurality of trigger levels, and in response to the first trigger level being reached, applying a mitigation technique to the DRAM corresponding to the first trigger level.

9. The system of claim 8, wherein the RowHammer detection circuit further comprises an assigned address range defining the corresponding segment for each counter of the plurality of counters.

10. The system of claim 8, wherein the RowHammer detection circuitry is configured to:

after the mitigation technique corresponding to the first trigger level is applied, determining that a count value of any second one of the plurality of counters has reached a second trigger level of the plurality of trigger levels, the second trigger level corresponding to a higher count value than the first trigger level; and in response to the second trigger level being reached, applying a mitigation technique to the DRAM corresponding to the second trigger level.

11. The system of claim 10, wherein the RowHammer detection circuitry is configured to:

after the mitigation technique corresponding to the second trigger level is applied, determining that a count value of any third one of the plurality of counters has reached a third trigger level of the plurality of trigger levels, the third trigger level corresponding to a highest count value of the increasing count values; and in response to the third trigger level being reached, applying a mitigation technique to the DRAM corresponding to the third trigger level, wherein the third trigger level stops a subsequent activate command from reaching the DRAM.

12. The system of claim 11, wherein the RowHammer detection circuit is configured to, in response to the third trigger level being reached, stopping the subsequent activate command from reaching the DRAM at least until a refresh time period ends.

13. The system of claim 10, wherein the RowHammer detection circuit is configured to apply the mitigation technique corresponding to the first trigger level by adjusting one or more timing parameters.

14. The system of claim 13, wherein the one or more timing parameters comprise at least one of: a minimum time between an activate and a subsequent precharge command, or a minimum time to re-activate a closed wordline.

15. The system of claim 13, wherein the RowHammer detection circuit is configured to apply the mitigation technique corresponding to the second trigger level by adjusting a frequency of refreshes.

* * * * *